(12) United States Patent
Nimberger

(10) Patent No.: US 6,272,931 B1
(45) Date of Patent: Aug. 14, 2001

(54) FULL DRAIN AND VENT ADAPTER FOR PRESSURE SENSING TRANSMITTER

(75) Inventor: Spencer M. Nimberger, Houston, TX (US)

(73) Assignee: PGI International, Ltd., Houston, TX (US)

(*) Notice: Subject to any disclaimer, the term of this patent is extended or adjusted under 35 U.S.C. 154(b) by 0 days.

(21) Appl. No.: 09/395,028

(22) Filed: Sep. 13, 1999

Related U.S. Application Data
(60) Provisional application No. 60/100,181, filed on Sep. 14, 1998.

(51) Int. Cl.[7] .................................................. G01L 7/00
(52) U.S. Cl. ...................................................... 73/756
(58) Field of Search ........................... 73/756, 28.03, 73/29.03, 30.02; 137/557, 597

(56) References Cited

U.S. PATENT DOCUMENTS 5,823,228 * 10/1998 Chou ..................................... 137/597

OTHER PUBLICATIONS

IntelliMount[TM] System, "a new generation of instrument manifold systems", Anderson Greenwood tyco flow contgrol. (No Date).

Model 305 and 306 Manifold Solutions, Rosemount[R], Fisher–Rosemount[TM] Managing The Process Better[TM] (No Date).

Model 305 Integral Manifolds, Rosemount[R] Measurement, Fisher–Rosemount[TM] Managing The Process Better[TM] (No Date).

* cited by examiner

Primary Examiner—William Oen
(74) Attorney, Agent, or Firm—Jenkens & Gilchrist, P.C.

(57) ABSTRACT

A full drain and vent adapter for mounting a pressure sensing transmitter or similar test instrument to a standard manifold is reversible for use in either gas or liquid pressure sensing applications. Combination vent or drain plugs are provided at the top and bottom of the adapter to provide drains at the bottom of the adapter and vents at the top of the adapter, regardless of liquid or gas service applications.

7 Claims, 2 Drawing Sheets

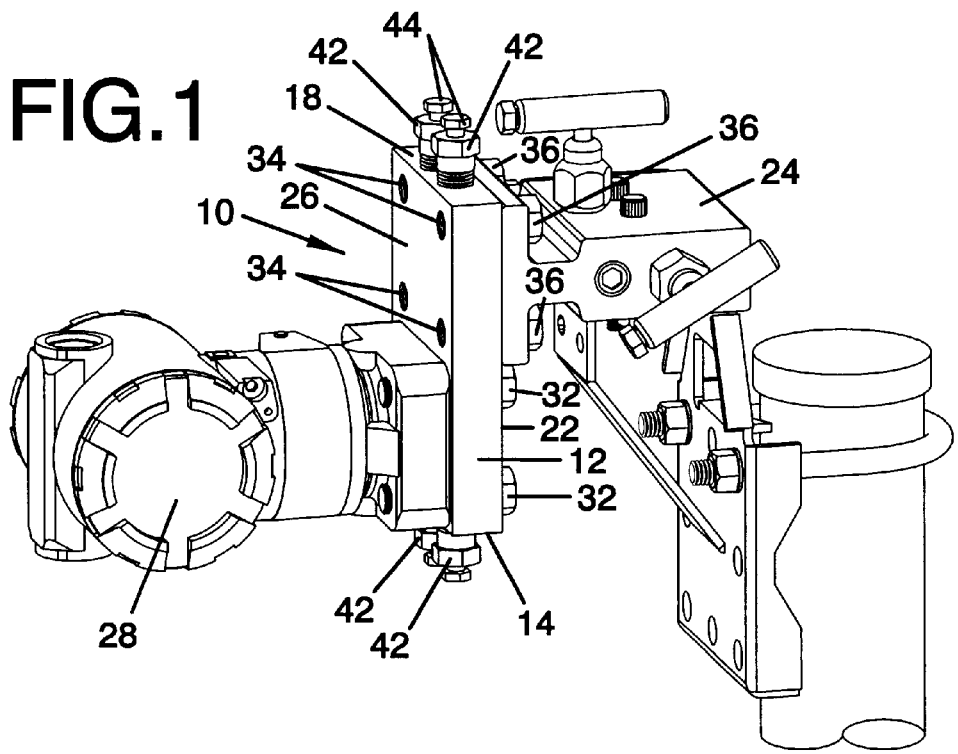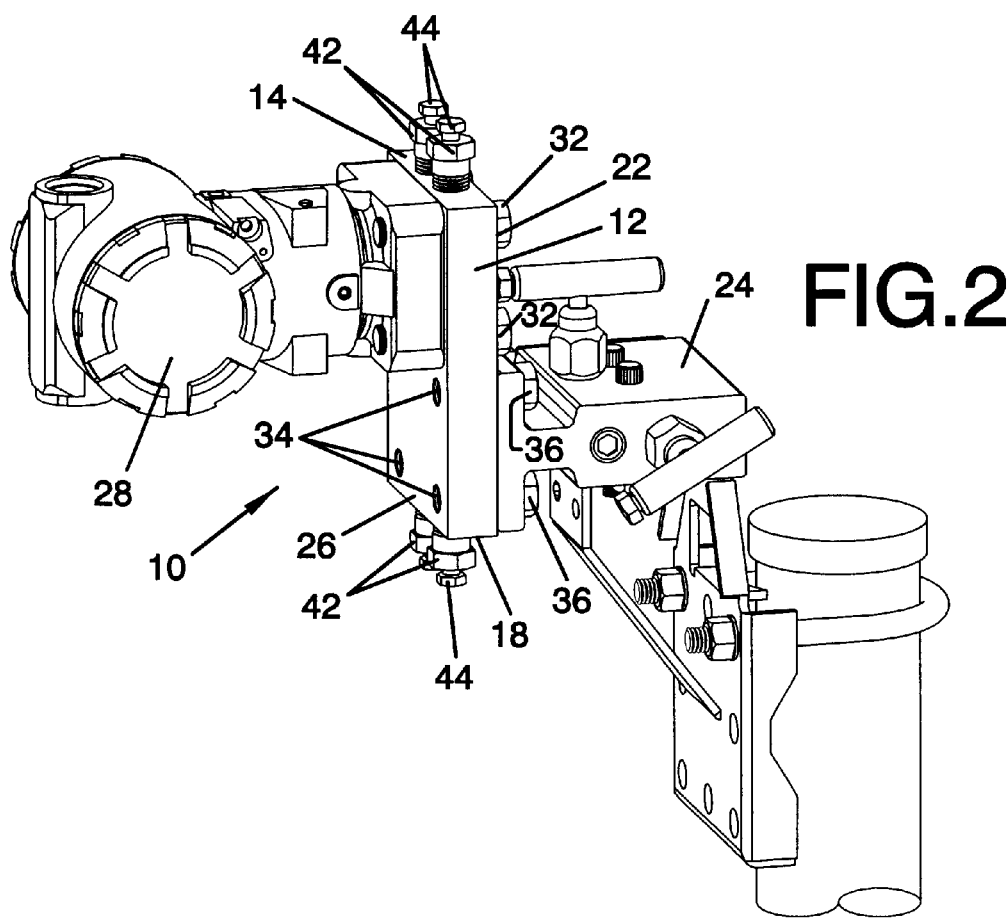

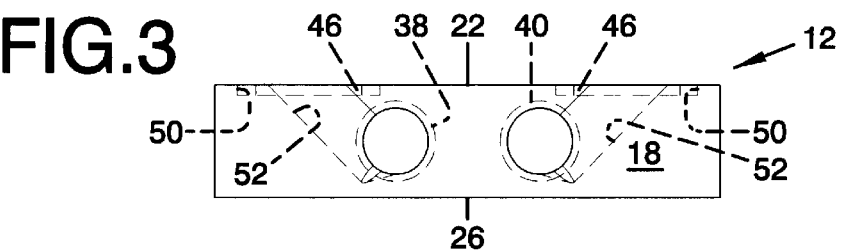
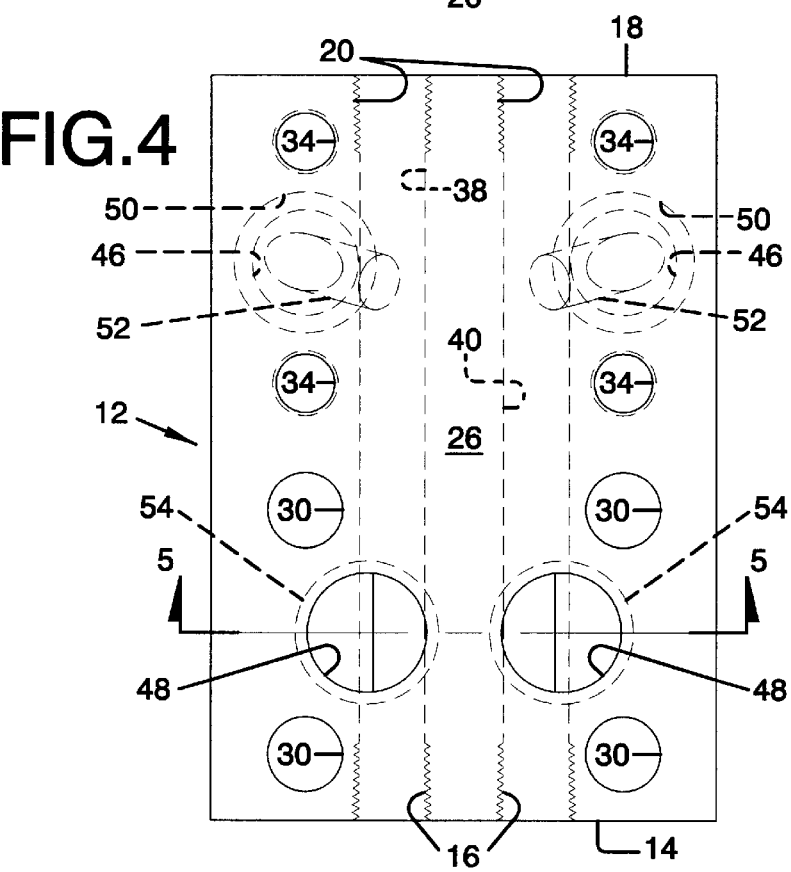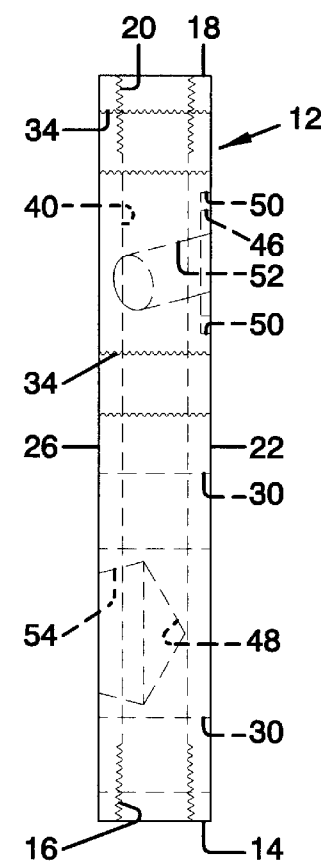
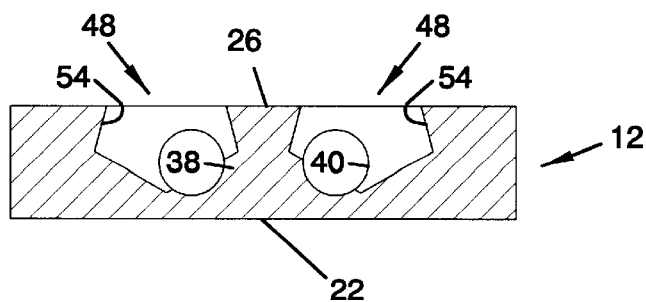

FULL DRAIN AND VENT ADAPTER FOR PRESSURE SENSING TRANSMITTER

This application claims the benefit under Title 35 United States Code §119(e) of U.S. Provisional Application No. 60/100,181, filed Sep. 14, 1998.

BACKGROUND OF THE INVENTION

1. Technical Field

This invention relates generally to an adapter for mounting a pressure-sensing transmitter in a vertical orientation, and more particularly to such an adapter that is suitable for use in either gas or liquid pressure sensing applications.

2. Background Art

Multi-valve manifolds have been used to mount pressure sensing transmitters such as Rosemount® Coplanar™ style pressure transmitters. Such multi-valve manifolds are adapted for specific use in either a gas or in a liquid process application. Threaded plugs are typically installed in test ports on the top of the valve, and the valve is constructed in such a manner that prevents it from being reversed end for end, thus requiring separate configurations for liquid service and gas service applications. Additionally, it is difficult to drain condensate from the pressure cavities of the manifold and transmitter in order to avoid calibration errors. Also, since pressure sensing transmitters are now generally mounted directly to a multi-valve manifold in a field environment, it is difficult to accurately tighten the mounting bolts to assure that the high torque requirements specified by the transmitter manufacturer are met.

The present invention is directed to overcoming the problems set forth above. It is desirable to have a simple adapter that can be directly mounted to a standard horizontal mount blocking manifold, which thereby places the transmitter sensing foils in a vertical plane. As the result of the transmitter sensing foils being disposed in a vertical plane, condensate or deposits on the foils will not affect measurement accuracy, and the foil face can be either fully vented or fully immersed in the pressure media. This is impossible with horizontally positioned foils. It is also desirable to have an adapter that is reversible end for end (top for bottom) so that the pressure transmitter can be used in either liquid or gas service applications. It is also desirable to have a full drain and vent adapter for pressure sensing transmitters that has a foil cavity design in the adapter that allows full drain or vent even if the adapter is misaligned vertically by up to 15%. Furthermore, it is desirable to have such a full drain and vent adapter for mounting pressure-sensing transmitters that allows factory or shop torquing of the transmitter head to the manufacturer's specified high torque values, and additionally protects the sensing foils during shipping, handling, and installation of the pre-assembled unit at a field site.

SUMMARY OF THE INVENTION

In one aspect of the present invention, a reversible adapter for selectively mounting a pressure-sensing transmitter to a manifold in either a liquid or a gas system has a first end surface in which a pair of vent ports are disposed, a second end surface that also has a pair of end ports disposed therein, first and second planar surfaces extending between the first and second end surfaces, and a pair of spaced-apart internal passageways. The first planar surface is adapted for mounting the adapter to a predefined manifold, and the second planar surface is adapted for mounting a pressure-sensing transmitter or test instrument thereon. The adapter also has a first set of apertures that extend through the adapter from the second planar surface to the first planar surface at a position approximate the first end surface, and a second set of apertures extending through the adapter from the second planar surface to the first planar surface at a position proximate the second end surface. The reversible adapter further includes a pair of spaced-apart internal passageways disposed in mutually parallel relationship. Each of the passageways respectively extend between a separate one of the pair of vent ports disposed in the first end surface and a corresponding separate one of the vent ports disposed in the second end surface.

Other features of the reversible adapter embodying the present invention include the first planar surface having a pair of ports defined therein that are arranged to mate with a corresponding pair of ports on the predefined manifold, each port of the pair of ports being in respective communication with a separate one of the internal passageways in the body of the adapter. Other features include each member of the pair of ports on the first planar surface having a groove formed in the first planar surface that is disposed in spaced circumscribing relationship about the respective port. Still other features include the reversible adapter having a pair of ports defined on the second planar surface that are arranged to mate with a corresponding pair of ports on the pressure sensing transmitter, with each port of the pair of ports on the second planar surface being in respective communication with a separate one of the internal passageways in the body of the adapter.

Yet additional features of the reversible adapter embodying the present invention include each aperture of the first set of apertures extending from the second planar surface to the first planar surface at a position proximate the first end surface has a smooth bore adapted to receive a fastening member therethrough for engagement with the base of the pressure sensing transmitter. Another feature includes each aperture of the second set of apertures extending from the second planar surface to the first planar surface at a position proximate the second end surface of the adapter has a threaded bore adapted to receive a fastening member extended through a portion of the predefined manifold.

Yet another feature of the reversible adapter embodying the present invention includes the adapter body being reversibly mountable in a substantially vertical plane wherein the first end surface is positionable elevationally above the second end surface and the vent ports of the second end surface provide drain ports for the internal passageways of the body, and the second end surface is positionable elevationally above the first end surface and the vent ports of the first end surface provide drain ports for the internal passageways of the body when the adapter is mounted on the manifold of a gas processing system.

BRIEF DESCRIPTION OF THE DRAWINGS

A more complete understanding of the structure and operation of the present invention may be had by reference to the following detailed description when taken in conjunction with the accompanying drawings, wherein:

FIG. 1 is a in three-dimensional view of the full drain and vent adapter, for pressure sensing transmitters, embodying the present invention, in which the adapter is oriented for use in liquid service applications;

FIG. 2 is a three-dimensional view of the full drain and vent adapter, for pressure sensing transmitters, embodying the present invention, in which the adapter is oriented for use in gas service applications;

FIG. 3 is an end view of the full drain and vent adapter, for pressure sensing instruments, embodying the present invention;

FIG. 4 is a top view of the full drain and vent adapter, for pressure sensing instruments, embodying the present invention;

FIG. 5 is a cross-sectional view, taken along the line 5—5 of FIG. 4, of the full drain and vent adapter embodying the present invention; and FIG. 6 is a side view of the full drain and vent adapter, for pressure sensing transmitters, embodying the present invention.

BRIEF DESCRIPTION OF THE PREFERRED EMBODIMENT OF THE PRESENT INVENTION

The full drain and vent adapter for pressure-sensing transmitters, embodying the present invention, is generally defined in the drawings by the reference numeral 10. In FIG. 1, the adapter 10 is oriented for use in liquid surface applications, and in FIG. 2, the adapter 10 is oriented for use in gas surface applications.

The full drain and vent adapter 10 has a body 12, defining a generally rectangular quadrilateral shape, having, as best shown in FIGS. 4 and 6, a first end surface 14 having a first pair of threaded vent ports 16 defined therein, and a second surface 18 having a second pair of threaded vent ports 20 defined therein. The adapter 10 also has a first planar surface 22 extending between the first end 14 and second end 18 that is arranged for mounting the adapter 10 to a predefined manifold 24. The adapter 10 further includes a second planar surface 26 that is spaced from the first planar surface 22 and extends between the first end surface 14 and the second end surface 18. The second planar surface 26 is arranged for mounting a pressure-sensing transmitter 28, or similar test instrument, thereon.

A first set of apertures 30 extend from the second planar surface 26 to the first planar surface 22 at a position proximate the first end surface 14. In the illustrated embodiment, the first set of apertures 30 have a smooth bore adapted to receive a fastening member 32 therethrough for engagement with predefined threads provided in the base of the pressure sensing transmitter 28 whereby the transmitter 28 is removably secured to the adapter 12. The full drain and vent adapter 10 further includes a second set of apertures 34 extending from the second planar surface 26 to the first planar surface 22 at a position proximate the second end surface 18. In the illustrated embodiment, each aperture 34 of the second set of apertures has a threaded bore adapted to receive a fastening member 36 extending through a flange portion of the manifold 24, whereby the adapter 12 is removably attached to the manifold 24.

Importantly, the full drain and vent adapter 10 embodying the present invention has two internal passageways 38, 40 which respectively extend between one of the first pair of vent ports 16 and a corresponding one of the second pair of vent ports 20. Each port of the first and second pair of vent ports 16, 20 is internally threaded to receive threaded plugs 42, which desirably have needle valves 44 disposed therein, so that the passageways 38, 40 can be opened, either incrementally or fully, to the atmosphere. In whichever vertical orientation the adapter 10 is used, the needle valve plugs 42, 44 positioned at the top of the adapter 10 serve to vent the passageways 38, 40 to atmosphere, and the needle valve plugs 42, 44 disposed at the bottom of the adapter 10 provide drains for the respective passageways 38, 40.

A pair of inlet ports 46 are disposed in the first planar surface 22 and are arranged to mate with predefined discharge ports provided on the manifold 10, such as the illustrated standard horizontal mount manifold illustrated in FIGS. 1 and 2. A pair of discharge ports 48 are disposed in the second planar surface 26 and are arranged to mate with predefined inlet ports of the pressure-sensitive transmitter 28, or a similar test instrument. Both inlet ports 46 and both discharge ports 48 are appropriately sealed at their interface with the adjacent manifold or transmitter, and are in direct fluid communication with a respective one of the internal passageways 38, 40. Desirably, each of the inlet ports 46 has an annular groove 50 formed in the first planar surface 22, in spaced circumscribing relationship about the respective port 46, for receiving an appropriate seal member, not shown. The discharge ports 48 may be similarly sealed with a seal member positioned in a corresponding groove on either the second planar surface 26 on the bottom of the transmitter 28.

The inlet ports 46 communicate respectively with one of the internal passageways 38, 40 by way of a short inclined passageway 52 extending between the respective inlet port 46 and a corresponding one of the internal passageways 38, 40. The passageways 52 are sloped, as best seen in FIG. 3, to provide drainage of cavities within the attached manifold 24 and transmitter 28 through the passageways 38, 40 to the drains 16 in liquid service applications. The discharge ports 48 diverge radially outwardly from the second planar surface 26 at the transmitter side of the adapter 10, as indicated by reference number 54, and then converge inwardly to the bottom of the port 48. The divergent sections 54 of the discharge port 48 prevent entrapment of liquid when the adapter 10 is mounted in a vertically misaligned position.

When the full drain and vent adapter 10 for pressure-sensing transmitters is used in liquid service applications, the adapter 10 is oriented as shown in FIG. 1, 4 and 6. That is, the threaded second holes 34 are provided in the upper portion of the adapter 10 to receive the threaded bolts 36 extending through the mounting flange of the standard horizontal mount manifold 24. Straight through-holes 30 are provided in the lower portion of the adapter 10 to permit for passage of mounting screws 32 therethrough for engagement with threaded holes provided in the base of the pressure sensing transmitter 28. The screws 32 are typically torqued to high values as specified by the manufacture of the transmitter 28.

When the full drain and vent adapter 10 for pressure-sensing transmitters is used in gas service applications, as shown in FIG. 2, the adapter 10 is turned 180°, i.e., top for bottom, from the orientation shown on in FIG. 1. In gas service applications, the drain plugs 42, 44 used in liquid service applications become vent plugs 42, 44, and the vent plugs 42, 44 in the liquid service applications become drain plugs 42, 44. In either application, the sensor foil area of the transmitter 28 lies at or very close to the second planar surface 26 and the ports 48 when the transmitter 28 and adapter 10 are joined together.

Thus, it can be readily seen that the full drain and vent adapter 10, for pressure-sensing transmitters, embodying the present invention allows the transmitter sensing foils to be positioned in a vertical plane while using a standard horizontal mount manifold 24. Advantageously, the vertical orientation of the sensing foils prevents condensate or deposits on the foils from affecting measurement accuracy. Also, as a result of the full drain and vent characteristics of the adapter 10, the foil face can be fully vented or fully immersed in a pressurized media, rendering the transmitter suitable for use in either liquid or gas service applications. Another important advantage of the full drain and vent adapter 10 is that the adapter cavities 48 adjacent the sensing foils of the transmitter 28 are constructed so that they allow full drain or vent even if the adapter 10 is not precisely vertically aligned. A further advantage is that the full drain and vent adapter 10 embodying the present invention allows factory or shop assembly of the adapter 10 to a transmitter base, whereby the screws 32 securing the adapter 10 to the transmitter head can be tightened to the manufacturer's specified torque value in a factory or controlled shop environment. The thus-assembled adapter 10 and transmitter 28 provides desirable protection for the sensing foils of the transmitter 28 during subsequent shipment, handling, and installation.

Although the present invention is described in a specific exemplary embodiment, with specific illustrative port and passageway arrangements and drain/vent port constructions, those skilled in the art will recognize that changes in those arrangements and constructions can be made without departing from the spirit of the invention. Such changes are intended to fall within the scope of the following claims. Other aspects, features and advantages of the present invention may be obtained from a study of this disclosure and the drawings, along with the appended claims.

What I claim is:

1. A reversible adapter for selectively mounting a pressure-sensing transmitter to a manifold in either a liquid or a gas system, said adapter comprising a body having:

a first end surface having a pair of vent ports disposed therein;

a second end surface spaced from the first end surface and having a pair of vent ports disposed therein;

a first planar surface extending between said first and second end surfaces and arranged for mounting said adapter to a manifold;

a second planar surface spaced from said first planar surface and extending between said first and second end surfaces and arranged for mounting a pressure-sensing transmitter thereto;

said adapter having a first set of apertures extending from the second planar surface to the first planar surface at a position proximate said first end surface, and a second set of apertures extending from the second planar surface to the first planar surface at a position proximate said second end surface; and a pair of spaced apart internal passageways disposed in mutually parallel relationship, each passageway of said pair of passageways respectively extending between a separate one of said pair of vent ports disposed in said first end surface and a separate one of said vent ports disposed in said second end surface.

2. A reversible adapter, as set forth in claim 1, wherein said first planar surface has a pair of ports defined therein and arranged to mate with a corresponding pair of ports on said manifold, each port of said pair of ports in the first planar surface being in respective communication with a separate one of said internal passageways in said body of the adapter.

3. A reversible adapter, as set forth in claim 2, wherein each member of said pair of ports on the first planar surface has an annular groove formed in the first planar surface that is disposed in spaced circumscribing relationship about the respective port.

4. A reversible adapter, as set forth in claim 1, wherein said second planar surface has a pair of ports defined therein and arranged to mate with a corresponding pair of ports on said pressure-sensing transmitter, each port of said pair of ports in the second planar surface being in respective communication with a separate one of said internal passageways in said body of the adapter.

5. A reversible adapter, as set forth in claim 1, wherein each aperture of said first set of apertures extending from said second planar surface to said first planar surface at a position proximate the first end surface has a smooth bore and is adapted to receive a fastening member therethrough for engagement with predefined threads provided in the base of said pressure sensing transmitter.

6. A reversible adapter, as set forth in claim 1, wherein each aperture of said second set of apertures extending from said second planar surface to said first planar surface at a position proximate the second end surface has a threaded bore adapted to receive a fastening member extending through a portion of the manifold.

7. A reversible adapter, as set forth in claim 1, wherein said body is mountable in a substantially vertical plane and is reversible, first end for second end, in said vertical plane, said first end surface being positionable elevationally above the second end surface and the vent ports of said second end surface providing drain ports for the internal passageways of the body when said adapter is mounted on the manifold of a liquid processing system, and said second end surface being positioned elevationally above the first end surface and the vent ports of said first end surface providing drain ports for the internal passageways of the body when said adapter is mounted on the manifold of a gas processing system.

* * * * *